Dec. 9, 1924.
F. B. MENGE ET AL
1,518,533
TIRE CARRIER
Filed Jan. 5, 1921
2 Sheets-Sheet 1
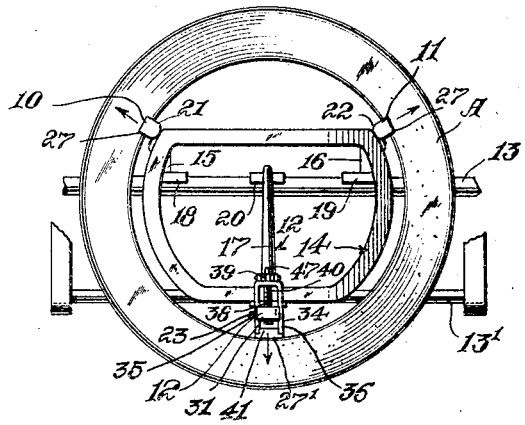
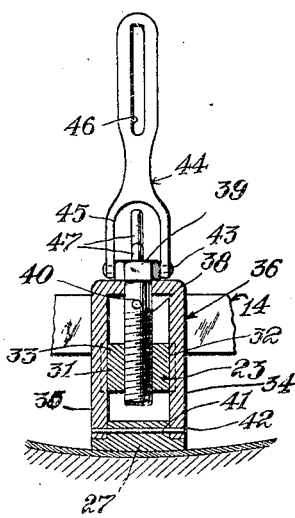
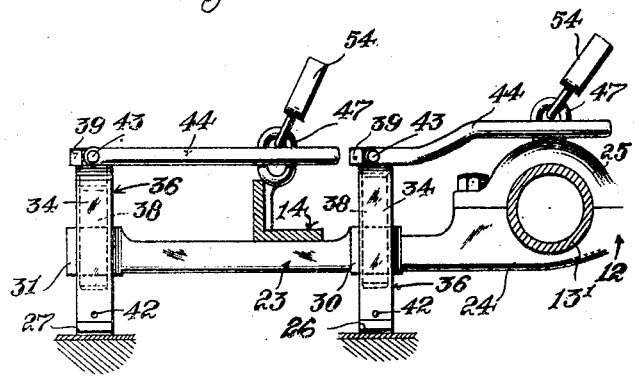
INVENTORS
Frank B. Menge
William Haab
BY
William S. Gluck
ATTORNEY.

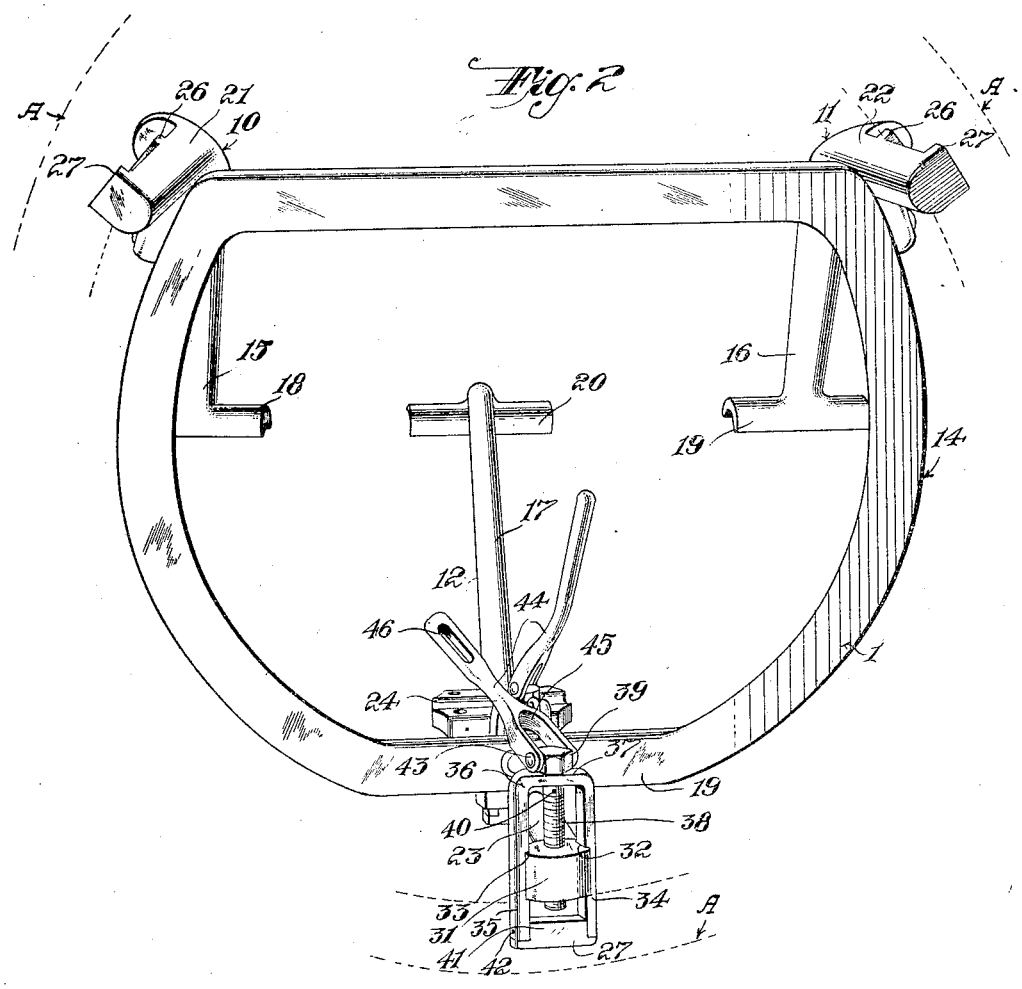

Patented Dec. 9, 1924.

1,518,533

UNITED STATES PATENT OFFICE.

FRANK B. MENGE AND WILLIAM HAAB, OF NEW YORK, N. Y., ASSIGNORS, BY DIRECT AND MESNE ASSIGNMENTS, TO PACKARD MOTOR CAR COMPANY, OF DETROIT, MICHIGAN, A CORPORATION OF MICHIGAN.

TIRE CARRIER.

Application filed January 5, 1921. Serial No. 435,149.

*To all whom it may concern:*

Be it known that we, FRANK B. MENGE and WILLIAM HAAB, citizens of the United States, and residents of New York city, in the State of New York, have invented certain new and useful Improvements in Tire Carriers, of which the following is a specification.

Our invention relates to article carriers and more particularly to carriers for extra tires of a motor vehicle.

Among the more important objects of our invention are: the provision of a tire carrier so constructed and arranged that all elements of the carrier are kept out of contact with the rubber of the tire; the provision in a tire carrier of supporting and securing means therefor arranged to permit of the tire being readily positioned on and removed from the carrier; the provision in a tire carrier of means adjustable toward and from a tire to support and secure said tire in position, and more particularly of non-rotatably adjustable means; the provision of an operating member for said adjustable means, which operating member is movable relative thereto; and the provision generally of a new, improved, simplified and more efficient tire carrying construction.

In attaining the objects stated and suggested, and certain additional benefits and advantages to be pointed out below, we have provided a construction, one exemplification of which is illustrated in the accompanying drawings, wherein—

Figure 1 shows our improved tire carrier in position on the rear end of a motor vehicle;

Figure 2 shows an enlarged view of the carrier;

Figure 3 is an enlarged detail in cross section and

Figure 4 is a view showing the position of the parts with two rims locked in position.

Viewing Figure 2, the tire carrier comprises generally the three bracket arms 10, 11 and 12 supported in substantially parallel vertical planes from the cross rods 13 and 13' of the rear frame of a motor vehicle (see Fig. 1). These bracket arms 10, 11 and 12 are braced from each other by means of the ring generally indicated at 14 and are supported from and secured to the cross rod 13 by means of the angularly disposed portions 15, 16 and 17 of the bracket arms 10, 11 and 12, the free ends of these angularly disposed portions being provided with the half sockets 18, 19 and 20 which fit on the cross rod 13 and to which they are secured in any desired manner.

The tire supporting portions 21, 22 and 23 of the bracket arms 10, 11 and 12 are preferably positioned parallel to each other, and are positioned for purposes of convenience, substantially equidistantly apart around the ring 14, the portions 21 and 22 being preferably on the same level when the carrier is in position on the motor vehicle and the portion 23 being positioned below and intermediate the portions 21 and 22. The angular extending portions 15 and 16 of the upper tire brackets 10 and 11 are preferably bent downwardly, and the portion 17 of the lower tire bracket 12 is bent upwardly so as to bring the half sockets 18, 19 and 20 carried at the extreme ends thereof in substantial alignment, so as to have them form portions of a substantially continuous channel portion received over the cross rod 13. To prevent any tendency of the carrier as a whole turning about the supporting rod 13 and at the same time to retain said carrier in a desired angular position, the bracket arm 12 is provided at the bend between the portions 17 and 23 thereof with the half socket 24 received under the cross rod 13' (see Figures 1 and 4) which is positioned below and to the rear of the cross rod 13 and secured to said cross rod 13' by the half socket 24 being detachably secured in any desired manner to the half socket 25 received over the cross rod 13'.

The extra tires A are supported by being received over the tire carrying or supporting portions 21, 22 and 23 and to add to the effectiveness of this operation, these portions 21, 22 and 23 are each provided with any desired number of lugs or projections 26 and 27 depending upon the number of tires to be carried, the use of two being illustrated for purpose of convenience. The lugs 26 and 27 are similarly positioned on all the bracket arms 21, 22 and 23 and thus in effect form sets of lugs, each set comprising one lug upon each bracket arm, each set being intended to be received within the circumferential groove generally found on the inner surface of a demountable rim. The sets of lugs 26 and 27 are spaced apart sufficiently to permit of the tires mounted on the rims being received between them. There is thus in effect provided a three point support for each of one or more tires as desired.

That the tires may be readily placed in position on and removed from the portions 21, 22 and 23 and over a set of lugs 26 or 27 carried thereby, one of these lugs preferably the lower one of each set namely that carried by the supporting portion 23 is made adjustable so that the radial distance of said lug may be shortened or lengthened. To obtain this result I have devised the construction now to be described.

The bracket portion 23 previously described is preferably though not necessarily enlarged to produce the widened portions 30 and 31 one for each set of lugs and, the sides of which are grooved or cut away at the diametrically opposite points 32 and 33, within which grooves are received the arms 34 and 35 of the U-shaped members 36. As the construction for supporting the lug 26 is the same as that for supporting the lug 27, the description will be confined to one of these lugs. This member 36 is thus mounted upon the portion 31 of the tire supporting member 23 for sliding movement in a direction toward and away from the tire rim, and is held against any turning movement with reference thereto.

A lug or foot piece 27 generally of the shape and performing the functions of the other lugs of the set 27, is positioned against the lower surfaces of the arms 34 and 35 of the U-shaped member 36 and has an upwardly projecting flange or lug 41 received between the said arms. A pin 42 passes through the flange or lug 41 and the arms 34 and 35 thus maintaining the parts in position. By this arrangement I have made provision for bracing the arms 34 and 35 against buckling or distortion.

The connecting web or base 37 of this U-shaped member 36 loosely receives the screw 38, the connecting web 37 being held against longitudinally movement with reference to the screw 38 by being engaged on one side by the head 39 of the screw and on the other side by the lugs 40 preferably formed by passing a pin through the screw of a length to have its ends extending beyond the screw 38. The screw 38 below the point of its engagement with the web 37 is threaded through the portion 31 previously described.

It therefore becomes obvious that as the screw 38 is turned in one direction or the other, the screw 38 will be moved either upwardly or downwardly through the portion 31, and will carry with it the U-shaped member 36, which is however prevented from rotating with the screw 38 through the non-rotatable engagement of its leg portions 34 and 35 with the grooves 32 and 33. By the arrangement thus far described and by which the foot piece or lug 27 is advanced by a non-rotatable sliding motion, this lug or foot 27 is brought into binding engagement with the rim without any turning movement thereof, and the obvious objections to this manner of operation avoided. This objection is particularly of importance where a tire cover is used in which case the rotating motion of an element therewith will tear and otherwise mutilate said cover. Furthermore by providing this sliding movement for the lug 27, this lug can be made of a shape and dimensions that will permit the lug or foot 27 to engage in the groove of the tire rim with better effect. Also this form of U-shaped sliding member with the foot-piece 27 secured thereto can be easily and cheaply produced.

The head 39 of the screw 38 is preferably made hexagonal and pivoted upon the projecting portions or pintles 43 thereof is the handle operating and locking member 44 the lower end 45 of which is made in the form of a yoke or fork and the upper end of which has the longitudinal slot 46 therethrough. This handle member 44 is thus pivoted to the head 39 of the screw 38 to swing about a horizontal axis and can be from the horizontal position shown in Figure 4 to the vertical or substantially vertical position shown in Figure 2. This handle member 44 can therefore be moved to any convenient position to permit of its use as a wrench for turning the screw 38, the hexagonal shape of the head 39 thereof and the pivots 43 cooperating to assist in this operation. Secured in any preferred or desired location and illustrated as secured to the ring 14, is the staple portion 47, over which is received the slot 46 of the handle member 44 which thus in effect becomes a hasp and which can be secured in position by the lock 54 (see Figure 4).

As clearly shown in Figure 2, the adjustable lug 27 is made rectangular in horizontal section, and is of such dimensions that it will enter the groove of the tire rim and be in non-rotatable engagement with the side walls thereof.

Having thus described our invention and illustrated its use, what we claim as new and desire to secure by Letters Patent is:

1. A tire carrier having a plurality of radially extending members adapted to engage with a tire rim, one of said members being radially movable and comprising a device having spaced arms, said carrier having a supportnig portion extending between said arms and slidably engaged thereby, the outer ends of said arms having secured thereto a foot-piece adapted to engage a tire rim, the inner ends of said arms being rigidly connected by a transverse web, a screw extending through said web engaging said supporting portion of the carrier, the outer end of said screw being spaced inwardly from said shoe to permit radial movement of the same and means engaging the inner end of the screw for rotating the same.

2. A tire carrier having a plurality of radially extending members adapted to engage with the inner surface of the tire rim, one of said members benig radially movable and comprising a U-shaped device having spaced arms, said carrier having a supporting portion extending between said arms and slidably engaged thereby, the free ends of said U-shaped member extending outwardly and having secured thereto a footpiece for engaging a tire rim, a screw extending through the base or web of said U-shaped member and threadedly engaging said supporting portion of the carrier, said screw having a head adapted to bear against said base, and means for rotating said screw to force said U-shaped device outwardly.

3. A tire carrier having a plurality of radially extending members adapted to engage with the inner surface of a tire rim, one of said members being radially movable and comprising a U-shaped device having spaced arms, said carrier having a supporting portion extending between said arms, said supporting portion also having grooves, in which said arms are slidably received. the free ends of the arms of said U-shaped member extending outwardly and having means for engaging a tire rim, a screw extending through the base or web of said U-shaped member and threadedly engaging said supporting portion of the carrier, said screw having a head adapted to bear against said web to force said U-shaped device outwardly when said screw is rotated, and means for rotating said screw.

4. A tire carrier having a plurality of radially extending members adapted to engage with the inner surface of the tire rim, one of said members being radially movable and comprising a U-shaped device having spaced arms, said carrier having a supporting portion extending between said arms and slidably engaged thereby, the free ends of the arms of said U-shaped member extending outwardly and having means for engaging a tire rim, a screw extending through the base or web of said U-shaped member and threadedly engaging said supporting portion of the carrier, said screw having a head adapted to bear against said web to force said U-shaped device outwardly when said screw is rotated in one direction, and means for engaging the other side of said web to force said U-shaped device inwardly when the screw is rotated in the opposite direction, and means for rotating said screw.

In testimony whereof we have hereunto signed our names.

FRANK B. MENGE.
WILLIAM HAAB.